Nov. 13, 1923.  
A. L. LEFFINGWELL  
1,474,327  
THREADING MACHINE FOR BOLTS, PIPES, ETC  
Filed Dec. 22, 1920  
2 Sheets-Sheet 1

INVENTOR  
Albert L. Leffingwell.  
by Hazard & Miller  
ATTYS.

Nov. 13, 1923.   1,474,327
A. L. LEFFINGWELL
THREADING MACHINE FOR BOLTS, PIPES, ETC
Filed Dec. 22, 1920   2 Sheets-Sheet 2
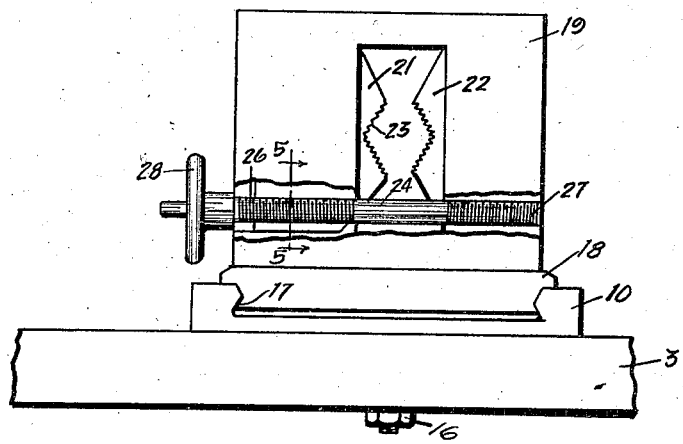
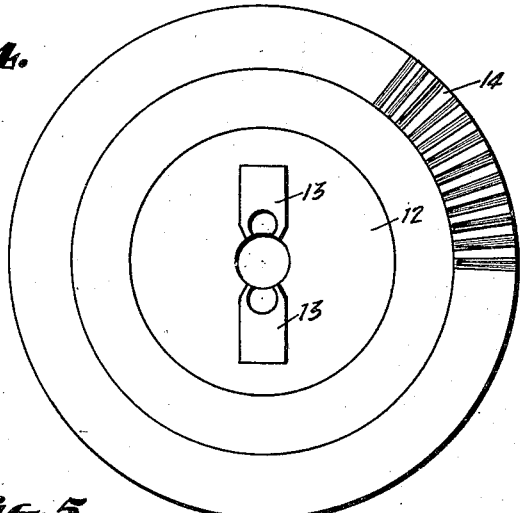
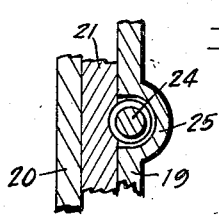
INVENTOR
Albert L. Leffingwell
by Hazard & Miller
ATTYS.

Patented Nov. 13, 1923.

1,474,327

UNITED STATES PATENT OFFICE.

ALBERT L. LEFFINGWELL, OF LOS ANGELES, CALIFORNIA, ASSIGNOR OF ONE-HALF TO ELI HERRING, OF LOS ANGELES, CALIFORNIA.

THREADING MACHINE FOR BOLTS, PIPES, ETC.

Application filed December 22, 1920. Serial No. 432,549.

*To all whom it may concern:*

Be it known that I, ALBERT L. LEFFINGWELL, a citizen of the United States, residing at Los Angeles, in the county of Los Angeles and State of California, have invented new and useful Improvements in Threading Machines for Bolts, Pipes, Etc., of which the following is a specification.

It is the object of this invention to provide a threading machine for threading bolts, pipes and the like, the threading machine comprising a structure readily mountable upon a usual metal working machine such as a drill press in order that the threading machine may be operated from a rotating part of the machine upon which it is mounted.

The threading machine includes a base having a support slidable thereon and adapted to carry the member to be threaded, and a rotatable die member also mounted upon the base and arranged to engage the work carried by the slidable support, so as to thread the same, the support readily sliding toward the die member as threads are cut by the latter in the work.

Figure 1:
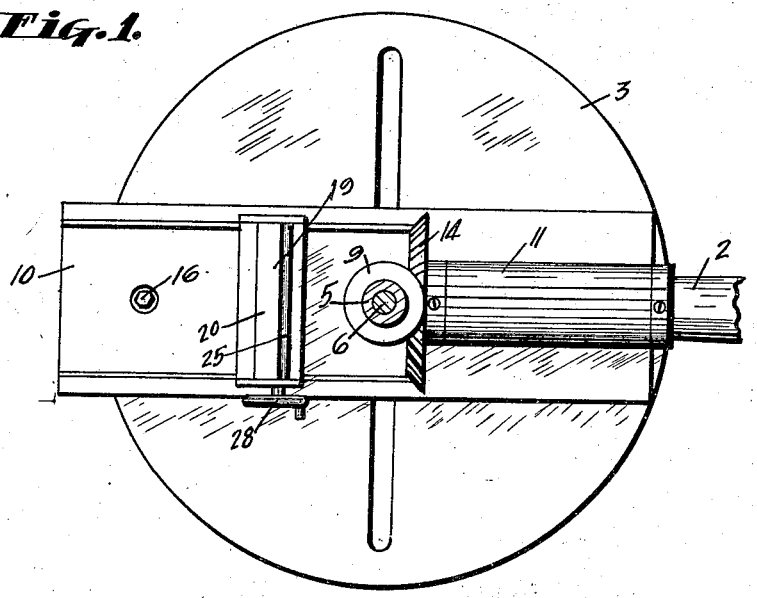
Figure 2:
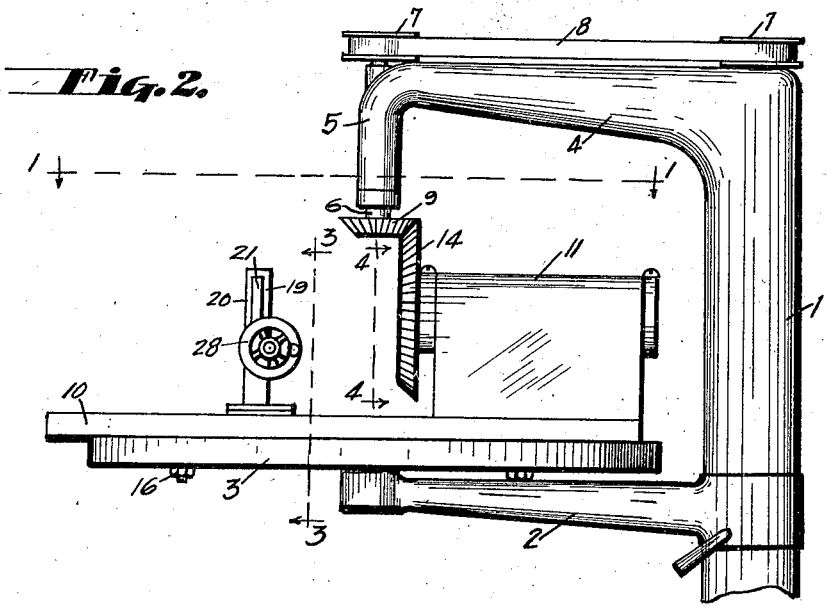

The invention will be readily understood from the following description of the accompanying drawings, in which Figure 1 is a horizontal section through a machine constructed in accordance with the invention and taken on the line 1—1 of Fig. 2.

Fig. 2 is a side elevation of the machine.

Figs. 3 and 4 are transverse sections on the lines 3—3 and 4—4 of Fig. 2.

Fig. 5 is a detail section on the line 5—5 of Fig. 3.

The improved threading machine is illustrated as employed in connection with a usual drill press, although it will be obvious that it may be readily mounted in any desired manner. In the present instance the threading machine is so arranged that it may be operated by a rotating part of the drill press.

The drill press is of usual construction including standard 1 having the vertically adjustable lateral arm 2 carrying the work support 3. Above the work support the standard 1 terminates in a lateral arm 4 having the depending frame 5 for the spindle 6. The spindle may be rotated in any usual manner shown as comprising pulleys 7 and a belt 8. In order to adapt the drill press for use as driving means for the threading machine, the spindle 6 is provided with a beveled pinion 9 from which power is taken for operating the threading machines.

The threading machine includes a base 10 having the frame 11 at one end thereof with a usual threading die 12 secured therein. The threading die includes the usual die member 13 for threading pipes, bolts and the like. The threading die is provided with a beveled gear 14, and the threading machine is so positioned that gear 14 meshes with pinion 9 in order that rotation of the pinion will rotate the threading die for threading the work fed to the same.

The threading machine may be fixed in its operative position as thus described by fastening the base 10 of the threading machine to the work support 3 of the drill press. For this purpose suitable bolts 16 may be received through the base of the threading machine and through the work support.

Supporting means for the work to be threaded is slidable along base 10 toward and away from the threading die, and for this purpose the base 10 is provided with a grooved guideway 17 in which is slidable the base 18 of the support for the work. The work support extends upwardly from base 18 and includes spaced plates 19—20 between which are slidable co-operating jaws 21—22 adapted to engage a bolt, pipe or the like between the notched jaw surfaces 23. The jaws are slidable relative to one another in order to form a clamping support. The operating mechanism for thus sliding the jaws includes a transverse rod 24 journaled in a bearing 25 provided in plate 19. The opposite ends of the rod engage the surfaces of the respective jaws 21—22 and this engagement is a threaded connection with the threads 26—27 at the respective ends of the rod reversely arranged with relation to one another, so that rotation of the rod in opposite directions will move the jaws toward one another or spread the latter apart. The rod 24 may be rotated by a usual hand wheel 28.

In practice the work to be threaded is clamped in the work support with the end of the work engaged by the threading die. The threading die is then rotated by the driving connection provided by the spindle of the drill press, and as a consequence the work will be threaded by the die, the work and its support freely moving toward the threading die as the threading progresses.

It will thus be seen that I have provided an extremely simple threading machine, which may form an attachment for a usual metal working machine, the threading attachment being supported by the machine and driven therefrom.

Various changes may be made without departing from the spirit of the invention as claimed.

What is claimed is:

In combination, a drill press including a work support, a standard at one side of the support, an arm of L-shaped form extending laterally from the standard, a spindle journaled in the vertical portion of the arm, a second spindle journaled in the standard, means for operatively connecting the spindles at a point exteriorly of the arm and standard, a gear fixed to the lower end of the first spindle, a threading die upon the work support including a bevel gear meshing with the first gear, and a work support slidable on the first work support.

In testimony whereof I have signed my name to this specification.

A. L. LEFFINGWELL.